M. M. McINTYRE.
VEHICLE SPRING.
APPLICATION FILED MAY 3, 1907.

1,202,865.

Patented Oct. 31, 1916.
2 SHEETS—SHEET 1.

Witnesses:
A. L. Lord.
Brennan B. West.

Inventor.
Michael M. McIntyre
By Bates, Fouts & Hull,
Attorneys.

M. M. McINTYRE.
VEHICLE SPRING.
APPLICATION FILED MAY 3, 1907.
1,202,865.
Patented Oct. 31, 1916.
2 SHEETS—SHEET 2.
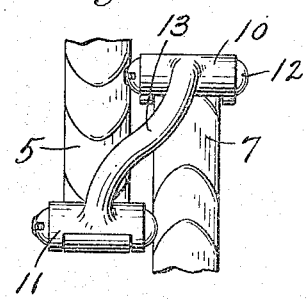
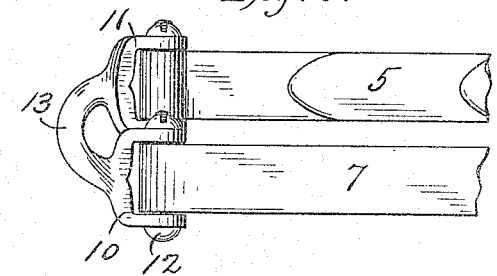
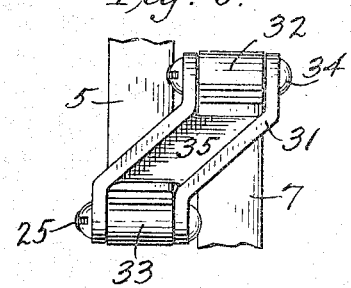
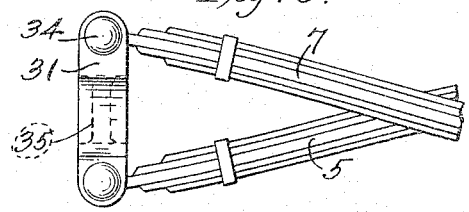
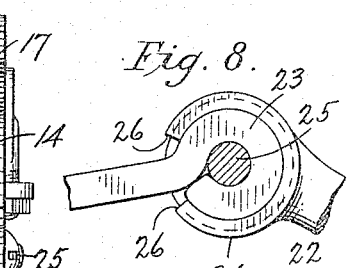
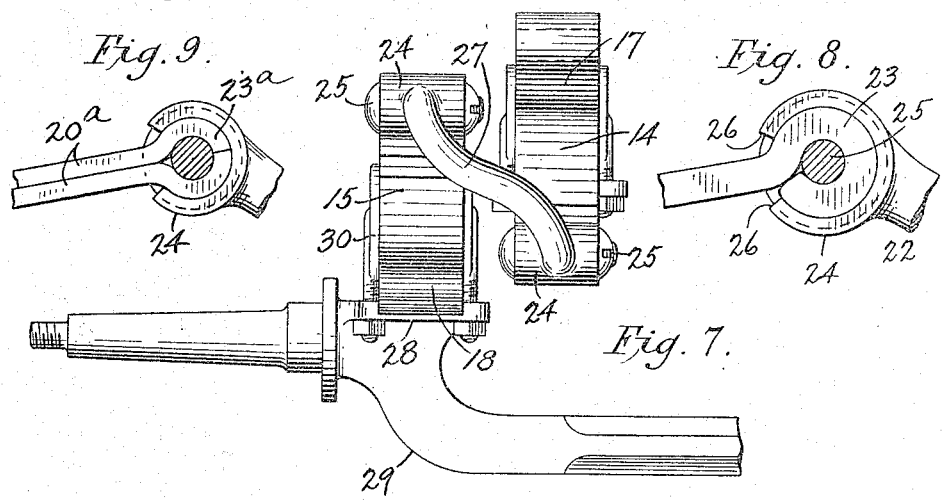
Witnesses:
A. L. Lord.
Brennan B. West.
Inventor.
Michael M. McIntyre
By Bates, Fouts & Hull,
Attorneys.

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

1,202,865.

Specification of Letters Patent.   Patented Oct. 31, 1916.

Application filed May 3, 1907.   Serial No. 371,759.

*To all whom it may concern:*

Be it known that I, MICHAEL M. MCINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

My invention relates to vehicle springs, and has for its object to provide a spring of this character which shall combine resiliency and strength, thereby securing ease of riding with freedom from liability of breakage of the springs.

A further object of the invention is to provide a form of spring which, while securing the above results, will enable the weight to be carried at a point adjacent to or below the axle, thereby lessening the shear of the spring on the axle when an obstruction is encountered by the vehicle wheel.

A further object of the invention is to prevent side swaying of the vehicle body by bringing the latter close to the axle and opposing to the sidewise movement of the body a double width of spring in the direction of such side-swaying and keeping the center of flexibility in substantially the plane of the axle.

Generally speaking, the invention may be defined as consisting of the combinations of elements for the purposes specified, embodied in the claims hereto annexed.

Figure 1:
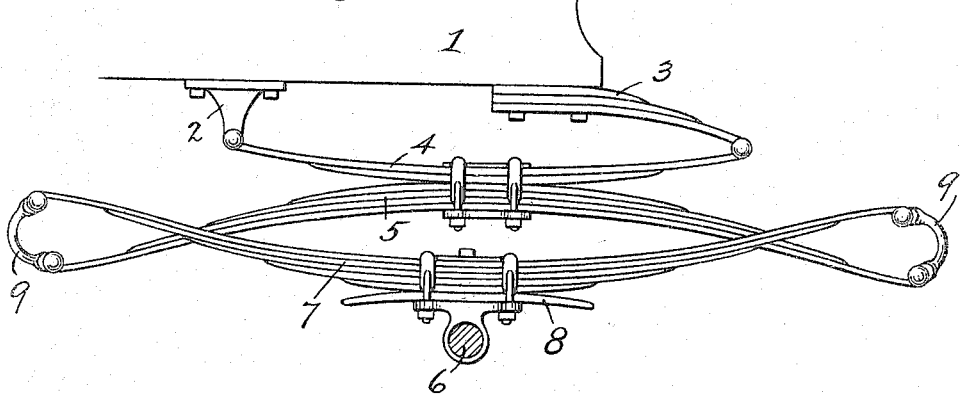
Figure 2:
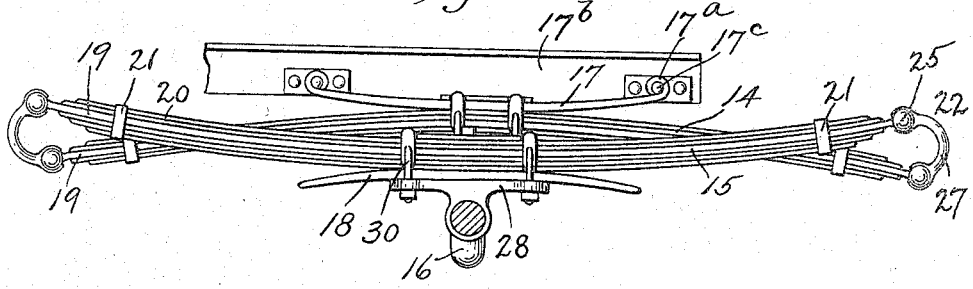

In the drawings forming a part hereof, Figure 1 represents a side elevation of one form of spring embodying my invention, showing the same connected to a vehicle. Fig. 2 shows a similar view of another form of spring constructed in accordance with my invention. Fig. 3 represents a top plan view of an end of the spring construction shown in Fig. 1. Fig. 4 represents an end elevation of the shackle and spring ends shown in Fig. 1. Fig. 5 represents an enlarged side elevation of the ends of a pair of springs connected by a modified form of shackle. Fig. 6 represents an end elevation of the shackle and spring ends shown in Fig. 5. Fig. 7 represents an end elevation, similar to Figs. 4 and 6, of the spring shown in Fig. 2, illustrating the manner in which the lower spring member is secured to a drop or cranked axle. Fig. 8 represents an enlarged detail illustrating the manner of securing the shackle to the ends of the spring shown in Fig. 2, and Fig. 9 shows a similar detail, two light main leaves being shown in place of the single heavy leaf of the former figure.

Describing the parts by reference characters, 1 represents the rear end of a vehicle, the same being provided with two hangers 2 and 3 respectively, the latter of which is shown as a spring hanger. To these hangers are connected the ends of an upper spring section 4, which is secured at its body to a lower spring section 5, said sections 4 and 5 comprising the upper spring member of my improved vehicle spring.

6 denotes the axle of the vehicle, to which is secured the body portion of the lower spring member 7. The lower spring member is made considerably heavier and stronger than the lower section 5 of the upper spring member, the parts being so proportioned that the strength of the lower spring member is substantially equal to the combined strength of the two sections 4 and 5 of the upper spring member at the ultimate deflection of the latter. The lower section of the upper spring member is shown in Fig. 1 as a semi-elliptic spring having long flexible ends, and the lower spring member is shown as a similar though heavier spring having comparatively long flexible ends. Between the bottom or shortest plate of the lower spring member and the axle there is interposed a spring seat 8, said seat being of substantially the same length as the next adjacent or shortest leaf of the lower spring member and curved downwardly somewhat on both sides of the axle.

The upper spring member and the lower spring member are not in the same vertical plane, but are placed said by side, as indicated more particularly in Fig. 3 of the drawing. The purpose of so arranging the spring members is to resist the side-swaying of the vehicle body by opposing thereto the combined widths of the spring members 5 and 7. This effect is increased by crossing the ends of the said spring members and connecting the same by shackles 9, thereby bringing the body and the center of flexibility of the springs so much the closer to the axle. The construction of this shackle is indicated more clearly in Fig. 4 and comprises a pair of sleeves 10 and 11, the former of which is connected to the eye of the lower spring member 7 by means of a pin or bolt 12, and the latter of which is connected to the end of the spring section 5 by means of a similar pin or bolt. The connecting bar or body 13 for the two sleeves is off-set from a vertical line, as shown in Fig. 4, to enable the sleeves to be fitted to the ends of the springs 5 and 7. The spring members are shown as applied to an axle of a vehicle adapted for the application or radius rods thereto, the center of the lower spring member 7 being sufficiently in front of the center of the upper spring member to allow the rearward movement of the axle by the radius rods without destroying the proper relation between the spring members and injuring the ends of said spring members and the connections between the same.

In Fig. 2, there is shown a modification of the spring shown in Fig. 1, the form of spring shown in Fig. 2 being especially adapted for use with vehicles having drop or cranked axles, though not limited in use to such axles. In the latter figure, the upper spring member is shown at 14. This member is nearly straight, the central portion being arched upwardly to a very slight extent as compared with the arch usually given to springs. The lower spring member 15 is similar to the upper spring member and is connected to the axle 16 with the arch thereof projecting downwardly. Both spring members are provided with curved spring bearing plates or seats 17 and 18 respectively, said plates extending on both sides of the centers of the spring members and being curved in a direction the reverse of that given to the said spring members. As a convenient means of attaching the upper spring member to the vehicle frame, the ends of the spring seat 17 may be provided with eyes 17$^a$ whereby they may be secured to frame 17$^b$ by means of studs 17$^c$. The two spring members 14 and 15 are similar in general construction and each comprises a central main leaf 19 and a plurality of auxiliary leaves 20 above and below said main leaf. The main leaf is the longest and when only one such leaf is used, is the heaviest leaf of the spring. The leaves next adjacent to the main leaf are nearly as long as the main leaf, while the leaves outside of and next adjacent to the former auxiliary leaves are somewhat shorter than the former auxiliary leaves. Adjacent to their ends, the auxiliary leaves are secured together and to the main leaf by means of clips 21. The ends of the spring members shown in Fig. 2 are connected together by shackles 22 which are generally similar to the shackles 9, but differing therefrom to adapt them for application to the particular form of spring for which they are employed. The main leaf 19 has at each end thereof an eye 23. Each end of the shackle 22 is provided with a partial sleeve 24 the interior of which is circular in section to receive and fit the corresponding circular outer surface of the eye 23. The parts are assembled by sliding the sleeve 24 onto the eye 23, using the bolt 25 to prevent the sleeve from sliding off the eye. The sleeve is in section somewhat more than a semi-circle, so as to be retained upon the eye, the inner ends 26 of the sleeve being spaced a sufficient distance apart to permit the rocking of the sleeve on the eye due to the relative movement between the ends of the spring members. The other end of the shackle is provided with a similar sleeve similarly engaging the eye on the main plate of the other spring member, the sleeves being connected by the bar 27. In applying the spring just described to a drop or cranked axle, the base plate 28 is applied to the spindle part of the axle as closely as possible to the bend 29. The top of this plate is of sufficient width to extend substantially to the extreme inner end of the upper surface of the spindle. The plate 18 and spring member 15 are then applied to the inner portion of said plate and are clamped in place by the clips 30. Spring member 14 is then connected to the frame in such a manner that the outer edge thereof will clear the inner end of the spindle, as indicated in Fig. 7. The upper spring member is then in position, under extreme load or shock, to swing downwardly beyond the lower spring member without striking the axle or the spindle. While I have shown the form of spring shown in Fig. 2 as applied to a drop axle, by merely increasing the curvature of the spring members slightly, or by providing a raised spring seat for the down spring member, the same type of spring may be employed with the ordinary or straight axle.

In Figs. 5 and 6 are shown a modification of the shackle shown in Figs. 3 and 4. This shackle is made as a casting and consists of side plates 31 spaced apart at their ends to receive the eyes 32, 33, on the ends of springs 5 and 7 respectively, said plates being provided with apertures for the bolts 34. The body portions of plates 31 are bent diagonally with respect to the ends thereof to enable a proper connection to be formed between the ends of springs 5 and 7, and said plates are connected by an integral web 35. In both forms of springs disclosed herein, the vehicle body, particularly when loaded, is brought close to the axle, whereby the leverage of said body which is exerted upon the axle in the lateral movements of the latter is correspondingly reduced. In the form of spring illustrated in Fig. 2, this leverage can be reduced to practically nothing, and in both forms of spring, the side-swaying is resisted by the combined widths of the two spring members which effectively restrain the same. Furthermore, owing to the comparatively short distance between the vehicle body and the axle, as well as to the arch of the spring, which causes the spring to hug the axle, the tendency of the spring to shear from the axle is reduced to a minimum when an obstruction is encountered. The peculiar type of shackle allows the ends of the springs to pass each other longitudinally; also with the type of spring shown in Fig. 2 it will, under proper conditions, prevent the inside spring from striking against the dropped portion of the axle.

In Fig. 9 there is represented a modification of the end of the spring shown in Figs. 2 and 8. In this modification the main leaf is composed of two light main-leaf sections 20$^a$, which are substituted for the heavy main leaf 19 of the former figures, each of said leaf sections being provided at its end with a half eye 23$^a$ which form together a complete eye for the application of the sleeve 24 of the shackle.

Having thus described my invention, I claim:

1. A vehicle spring comprising a pair of spring members placed side by side, each of said members comprising a main leaf and auxiliary leaves, eyes on the ends of the main leaves, and shackles connecting the adjacent ends of the spring members, each of said shackles having at its ends partial sleeves each adapted to be slipped sidewise over an eye on the end of a main leaf, and an off-set body portion connecting said sleeves.

2. A vehicle spring comprising a pair of spring members placed side by side, each of said members having a main leaf provided with eyes at opposite ends thereof, a shackle connecting the adjacent ends of the spring members, each of said shackles having a partial sleeve at opposite ends thereof, each of the partial sleeves being of greater extent than a semi-cylinder and adapted to be slipped sidewise off and on the eye of a main leaf, the shackle having an off-set body portion connecting the sleeves thereof, and bolts extending through the eyes of the main leaf and each having a head adapted to bear against one end of a sleeve and a nut adapted to bear against the opposite end of the sleeve.

In testimony whereof, I hereunto affix my signature in the presence of two witnesses.

MICHAEL M. McINTYRE.

Witnesses:
J. B. Hull,
S. E. Fouts.

Copies of this patent may be obtained for five cents each, by addressing the "Commissioner of Patents, Washington, D. C."